United States Patent [19]

Kowalkowski

[11] Patent Number: 5,303,496

[45] Date of Patent: Apr. 19, 1994

[54] SCENT DISTRIBUTING METHOD FOR HUNTERS

[76] Inventor: David Kowalkowski, 8698 Wall Rd., Armstrong Creek, Wis. 54103

[21] Appl. No.: 5,677

[22] Filed: Jan. 19, 1993

[51] Int. Cl.$^5$ ............................................. A01M 31/00
[52] U.S. Cl. .................................... 43/1; 124/54; 273/428; 42/54; 446/400
[58] Field of Search ................ 43/1; 124/1, 55; 273/428; 446/40; 239/6; 42/106, 54; 102/498, 502, 505

[56] References Cited

U.S. PATENT DOCUMENTS

| | | | |
|---|---|---|---|
| 1,348,224 | 8/1920 | Kemp | 446/400 |
| 3,049,828 | 8/1962 | Mills | 42/54 |
| 3,472,218 | 10/1969 | La Mers | 273/428 |
| 3,649,020 | 3/1972 | Hall | 273/428 |
| 4,634,606 | 1/1987 | Skogg | 273/428 |
| 4,788,787 | 12/1988 | Konietzki | 43/1 |
| 4,995,374 | 2/1991 | Black | 124/54 |

*Primary Examiner*—Rowan, Kurt C.
*Attorney, Agent, or Firm*—Wheeler Law Firm

[57] ABSTRACT

A method for applying a scent to a hunting or other desired location without approaching the area or contaminating it with human scent. The desired scent is placed in a carrying projectile means such as a pellet for a projectile delivery means such as a carbon dioxide operated gun and fired from a distance to the desired location.

10 Claims, No Drawings

SCENT DISTRIBUTING METHOD FOR HUNTERS

BACKGROUND OF THE INVENTION

The present invention relates generally to the field of hunting aids and specifically to application of animal scent to a hunting area.

It is common for hunters to use deer musk, bear musk, or other scents as an attractant for animals being hunted. The scents attract the animals to an area where a hunter waits. Hunters purchase these scents in bottles, and then apply the scent to a location where they are planning to hunt. The biggest problem with this method of scent application is that a hunter leaves human scent at the same location. Since animals are repelled by human scent, this type of application lessen the effectiveness of the attractant scent.

The attractant scents are very strong, and objectionable to human smell. Currently, the most common method of application for these scents is by physically going to the location to be hunted and applying the scent manually to rocks, trees, or shrubs in the hunting area. Alternatively, the scents may be dispersed from spray bottles. In those methods of scent application, the hunter is subjected to the objectionable smell of the attractant scents, in addition to contaminating the hunting area with human scent.

The present invention overcomes these problems by placing the scent product into a pellet of a size that may be fired from a gun. Guns and pellets appropriate for this use already exist. The guns are carbon dioxide gas operated guns normally used for shooting paint or dye pellets to mark a distant spot or for tactical games, where the paint or dye pellets are used to mark people competing in the game.

This method of delivering the attractant scent to the hunting area eliminates the human scent contamination of the area and also eliminates the objectionable element of the attractant scent smell to humans.

SUMMARY OF THE INVENTION

The applicant's invention provides a method for attracting animals without human scent contamination of a hunting area. The method involves inserting a scent for attracting animals into a carrying projectile means for carrying the attractant scent and then loading the carrying projectile means into a projectile delivery means and then firing the carrying projectile means from the projectile delivery means to deposit the scent a distance from the hunter, preferably on a deer or other animal trail. There are several advantages to applying animal attractant scent in this manner. First, using the present method will result in no human scent contamination of the hunting area. Second, hunters will have no direct contact with the objectionable smell of the attractant scent. Third, the present method will allow easy scent marking of locations that the hunter can clearly see while in a hunting stand or other desired hunting location.

Another use of the method is for training dogs to locate game. This is accomplished by putting scent of an animal that will be hunted or tracked by a dog into a carrying projectile means and shooting the carrying projectile means to a location to be found by the dog.

These and other benefits of the present invention will become apparent from the following detailed description thereof taken in conjunction with accompanying drawings.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

In the present invention, animal attractant scents such as deer musk, bear musk, or other scent products such as those made by Pete Rickard or Buck Stop. Such scents range from doe urine to tarsal gland scent to acorn and apple scents.

The desired scent is placed into a carrying projectile means, preferably a plastic or gelatin walled pellet, for being shot out of a projectile delivery means. Generally, the projectile delivery means is a compressed carbon dioxide ($CO_2$) gas operated gun, like the Nel-Spot 007. However, shell and cartridge type guns could also be used. It would only be necessary to adapt the pellet for use in those types of guns. Thus a bullet or shot, designed to hold the scent, could be used in place of the pellet. Accordingly, the type of projectile carrying means (bullet, shot, pellet, or the like) for carrying the desired scent may be adjusted to work with a particular type of projectile delivery means; e.g. compressed gas gun, normal rifle, or shot gun.

The pellets, after the desired scent has been applied, are loaded into the gun. The pellets are designed to break upon impact after being shot out of the gun. Accordingly, the pellets do not release the scent until they are shot against an object or at a location where a hunter desires the scent be placed. The distance from the hunter that the scent will be distributed will be different depending on the type of weapon the hunter uses. For example, the range of a bow and arrow will correspond to a smaller desired or predetermined area than the range of a rifle or other gun. The range or aim of the pistol may be adjusted to deposit scent at the desired distance.

When the desired hunting area and range have been determined, the hunter can remotely mark an animal run or trail with the desired scent, and can do so without contaminating the run or trail with human scent. This will lead to increased likelihood of success in the hunt.

Alternatively, the method disclosed here may also be used to train dogs to locate prey when hunting. In this variation the pellet is loaded with the desired scent, and fired to a location for the dog to find. The dog is then released to track down the location of the scent. Since the exact type of scent is known and the quantity of scent is controlled, the dog may be trained to track a specific type of animal and the training may be such that the amount of scent used may be reduced over time to increase the dog's sensitivity to the scent and thereby increase his efficiency and usefulness as a hunting dog.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method for a person to attract animals to a desired location without human scent contamination of the desired location comprising the steps of:
   (a) inserting a scent into a walled pellet for carrying the scent to the desired location;
   (b) inserting the walled pellet into a projectile delivery means for discharging the walled pellet;
   (c) discharging the walled pellet from the projectile delivery means at the desired location;
   (d) whereby the walled pellet impacts upon the desired location, and breaks, depositing the scent in the desired location so that contamination of the area with human scent is avoided.

2. The method according to claim 1 wherein the walled pellet means is inserted into a compressed gas gun.

3. The method according to claim 1 wherein the walled pellet means is inserted into a normal rifle.

4. The method according to claim 1 wherein the walled pellet means is inserted into a shotgun.

5. The method according to claim 1 wherein the walled pellet means is inserted into a carbon dioxide $(CO_2)$ gun.

6. A method for training dogs to locate a particular predetermined animal scent comprising the steps of:
   (a) inserting the predetermined animal scent into a walled pellet for carrying the predetermined animal scent;
   (b) inserting the walled pellet into a projectile delivery means particularly suited for discharging the walled pellet;
   (c) discharging the walled pellet from the desired type of gun at a predetermined area;
   (d) whereby the walled pellet impacts and breaks, depositing the predetermined animal scent.

7. The method according to claim 6 wherein the walled pellet means is inserted into a compressed gas gun.

8. The method according to claim 6 wherein the walled pellet means is inserted into a normal rifle.

9. The method according to claim 6 wherein the walled pellet means is inserted into a shotgun.

10. The method according to claim 6 wherein the walled pellet means is inserted into a carbon dioxide $(CO_2)$ gun.

* * * * *